(12) United States Patent
Baxter

(10) Patent No.: US 11,347,562 B2
(45) Date of Patent: May 31, 2022

(54) MANAGEMENT OF DEPENDENCIES BETWEEN CLUSTERS IN A COMPUTING ENVIRONMENT

(71) Applicant: HEWLETT PACKARD ENTERPRISE DEVELOPMENT LP, Houston, TX (US)

(72) Inventor: Joel Baxter, San Carlos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 116 days.

(21) Appl. No.: 16/506,952

(22) Filed: Jul. 9, 2019

(65) Prior Publication Data
US 2021/0011739 A1 Jan. 14, 2021

(51) Int. Cl.
*G06F 9/50* (2006.01)
*G06F 9/445* (2018.01)
*G06F 9/455* (2018.01)

(52) U.S. Cl.
CPC ........ *G06F 9/5077* (2013.01); *G06F 9/44505* (2013.01); *G06F 9/45558* (2013.01); *G06F 2009/45595* (2013.01)

(58) Field of Classification Search
CPC ............. G06F 9/44505; G06F 9/45558; G06F 2009/45595; G06F 9/5077
See application file for complete search history.

(56) References Cited

U.S. PATENT DOCUMENTS

| | | | |
|---|---|---|---|
| 9,515,869 B2 * | 12/2016 | Ngo | G06F 11/2035 |
| 2011/0289084 A1 * | 11/2011 | Fisher | H04N 21/8133 707/737 |
| 2016/0294930 A1 * | 10/2016 | Rewaskar | H04L 61/2076 |

* cited by examiner

*Primary Examiner* — Jacob D Dascomb
(74) *Attorney, Agent, or Firm* — Hewlett Packard Enterprise Patent Department

(57) ABSTRACT

Described herein are systems, methods, and software to manage configurations between dependent clusters. In one implementation, a management system maintains a data structure that indicates relationships between clusters in a computing environment. The management system further identifies a configuration modification to a first cluster and identifies other clusters associated with the first cluster based on the data structure. Once the other clusters are identified, the management system may determine configuration modifications for the other clusters based on the data structure and initiate deployment of the configuration modifications.

18 Claims, 6 Drawing Sheets

| CLUSTER ID 310 | RELIANT CLUSTER ID 320 | CONFIGURATION REQUIREMENTS 330 |
|---|---|---|
| ID 311 | ID 321 | REQUIREMENTS 331 |
| ID 311 | ID 322 | REQUIREMENTS 332 |
| ID 311 | ID 323 | REQUIREMENTS 333 |
| ID 311 | ID 324 | REQUIREMENTS 334 |
| ID 312 | | |
| ID 313 | | |
| ID 314 (FIRST CLUSTER 140) | ID 325 (DEPEND CLUSTER 141) | REQUIREMENTS 335 |
| ID 314 (FIRST CLUSTER 140) | ID 326 (DEPEND CLUSTER 142) | REQUIREMENTS 336 |

MANAGEMENT OF DEPENDENCIES BETWEEN CLUSTERS IN A COMPUTING ENVIRONMENT

BACKGROUND

An increasing number of data-intensive distributed applications are being developed to serve various needs, such as processing very large data sets that are difficult to be processed by a single computer. Instead, clusters of computers are employed to distribute various tasks, such as organizing and accessing the data and performing related operations with respect to the data. Various large-scale processing applications and frameworks have been developed to interact with such large data sets, including Hive, HBase, Hadoop, Spark, among others.

At the same time, virtualization techniques have gained popularity and are now commonplace in data centers and other computing environments in which it is useful to increase the efficiency with which computing resources are used. In a virtualized environment, one or more virtual nodes are instantiated on an underlying physical computer and share the resources of the underlying computer. Accordingly, rather than implementing a single node per host computing system, multiple nodes may be deployed on a host to more efficiently use the processing resources of the computing system. These virtual nodes may include full operating system virtual machines, containers, such as Linux containers or Docker containers, jails, or other similar types of virtual containment nodes.

In some implementations, clusters of virtual nodes may be dependent on, or be associated with, one or more other clusters in the same computing environment. For example, while a first cluster may process data from a storage repository, a second cluster may be used to visualize the data processing operations of the first cluster. To provide the visualization functionality, the second cluster may be provided with attributes, such as addressing and credential attributes, to access the virtual nodes of the first cluster. However, while the second cluster may be provided with initial attributes, the configuration attributes of the clusters may change during the lifecycle of the clusters. Further, as additional clusters are added to a computing environment, managing and configuring interdependent clusters of the environment can difficult and cumbersome.

SUMMARY

The technology described herein provides configuration management of dependent clusters in a computing environment. In one implementation, a management system maintains at least one data structure that indicates relationships between clusters of a computing environment. The management system further identifies a configuration modification to a first cluster and identifies one or more related clusters to the first cluster based on the at least one data structure. Once identified, the management system determines configuration modifications for the one or more clusters using the at least one data structure and initiates deployment of the configuration modifications.

DETAILED DESCRIPTION

Figure 1:
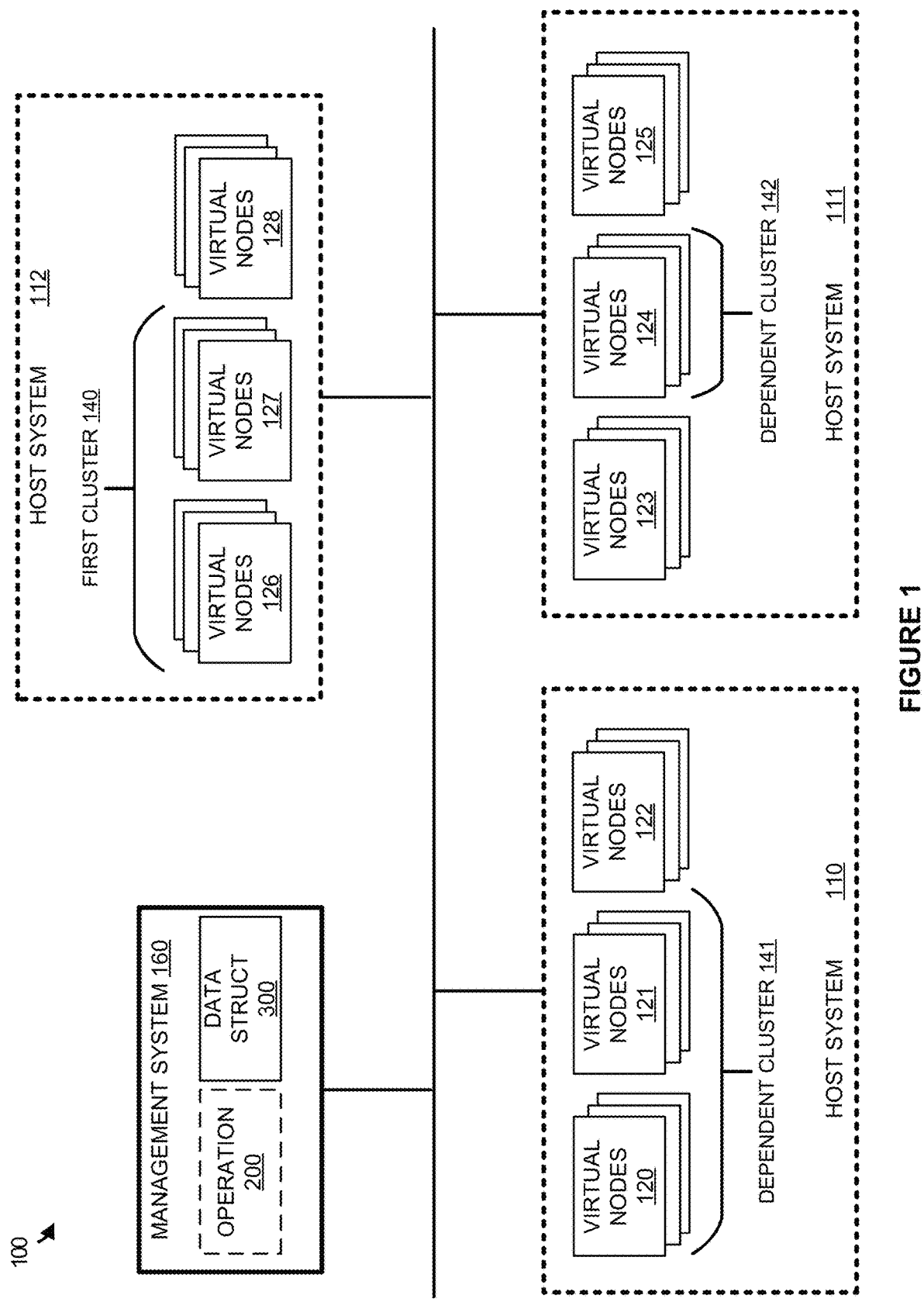
FIG. 1 illustrates a computing environment to update cluster configurations according to an implementation.

FIG. 1 illustrates a computing environment 100 to update cluster configurations according to an implementation. Computing environment 100 includes management system 160 and host systems 110-112. Host systems 110-112 may comprise physical computing systems, such as servers, desktop computers, or some other physical computing systems, or may comprise virtual machines in some examples. Host systems 110-112 further include virtual nodes 120-128 that provide clustered data processing operations in computing environment 100. Virtual nodes 126-127 represent first cluster 140, while virtual nodes 120-121 represent dependent cluster 141 and virtual nodes 124 represent dependent cluster 142. Management system 160 provides operation 200 that is further described in FIG. 2 and maintains data structure 300 that is further described in FIG. 3.

In operation, management system 160 deploys clusters in computing environment 100 using host systems 110-112. These clusters may each comprise virtual nodes that are used to process data sets in parallel, wherein the operations may comprise MapReduce operations, data search operations, or some other similar operations on data sets within the one or more storage repositories. The clusters may deploy data processing frameworks or applications that may comprise Hadoop, Spark, or some other distributed data processing framework. In some examples, the storage repositories may be stored on the same host systems as the virtual nodes, however, the storage repositories may be located on one or more other computing systems, such as server computers, desktop computers, or some other computing systems. The storage repositories may each represent data stored as a distributed file system, as object storage, or as some other data storage structure.

In deploying the clusters to host systems 110-112, management system 160 may be responsible for allocating computing resources to the clusters, and deploying the virtual nodes required for the clusters. The virtual nodes may comprise full operating system virtual machines or containers. The containers may comprise Linux containers, Docker containers, and other similar namespace-based containers. Rather than requiring a separate operating system, which is required for virtual machines, containers may share resources from the host computing system, wherein the resources may include kernel resources from the host operating system and may further include repositories and other approved resources that can be shared with other containers or processes executing on the host. However, although resources may be shared between the containers on a host, the containers are provisioned to have private access to the operating system with their own identifier space, file system structure, and network interfaces. The operating system may also be responsible for allocating processing resources, memory resources, network resources, and other similar resources to the containerized endpoint.

In some examples, in addition to the data processing framework clusters that process (e.g., read, write, manipulate, etc.) the data of the storage repositories, management system 160 may deploy clusters that provide edge services. These edge services, which may comprise Splunk, Hunk, Platfora, Graylog, or some other visualization and monitoring service, communicate with the virtual nodes of the data processing cluster and provide feedback to administrators and users associated with the cluster. The feedback may be used to provide user views or interfaces associated with the data processing operations, manage the data being processed by the cluster, or perform some other operation.

In some implementations, clusters that are deployed within computing environment 100 may be dependent on or communicate with other clusters to perform a required operation. For example, the edge service clusters may require addressing and credential information to access virtual nodes associated with a data processing framework cluster. Here, in computing environment 100, first cluster 140 is deployed with virtual odes 126-127, while dependent clusters 141-142 are deployed with virtual nodes 120-121 and 124. Dependent clusters 141-142 may require information or attributes about first cluster 140 to provide the required operations, such as visualization and monitoring operations. The required information may include addressing attributes associated with first cluster 140, security requirements associated with first cluster 140, version information about first cluster 140, or some other attributes related to accessing or communicating with first cluster 140.

In managing the required attributes for the dependent clusters, management system 160 maintains at least one data structure, such as data structure 300, which can be used to associate dependent clusters and define attributes required by the dependent clusters. These associations may be determined when the clusters are deployed, such that an administrator or user associated with the clusters may define the relationships between the clusters. Additionally, the administrator associated with the deployment of the clusters or management system 160 may determine the required attributes to be shared between the clusters. In at least one implementation, management system 160 may determine the required attributes based on the cluster types of the related clusters. For example, if a first cluster type is selected for first cluster 140 and a second cluster type is selected for dependent cluster 141, management system 160 may determine the attributes required for the second cluster type from the first cluster type and store the required attributes in data structure 300. As a result, when configuration modifications are made to first cluster 140, the management system may determine whether the configuration modification corresponds to an attribute required by dependent cluster 141 and update dependent cluster 141 based on the modification.

Figure 2:
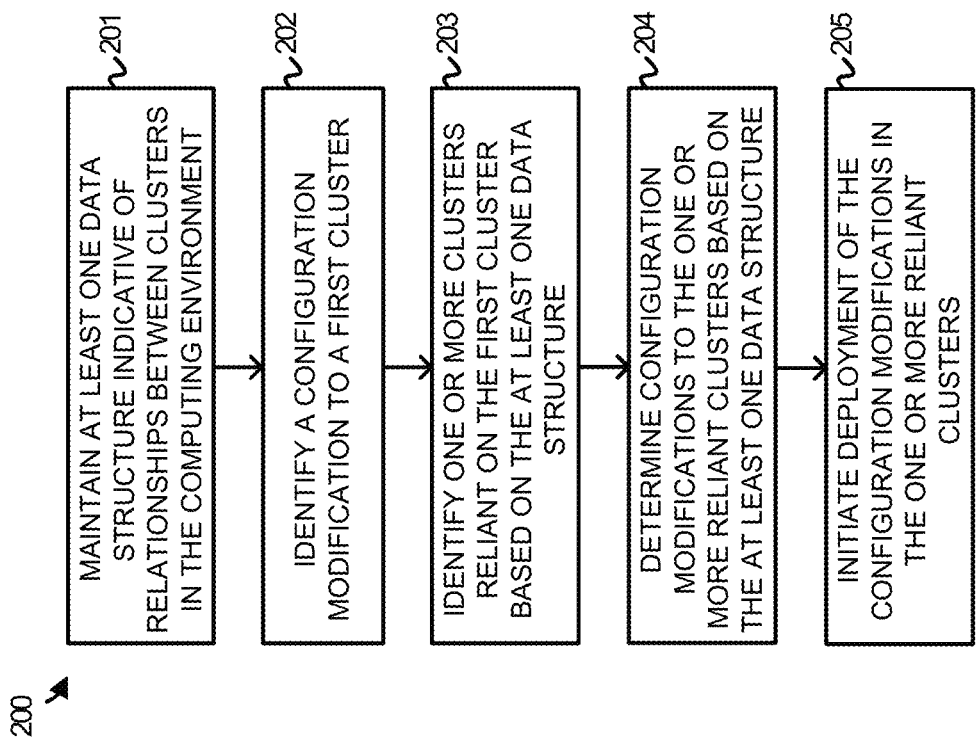
FIG. 2 illustrates an operation of a management system to update cluster configurations according to an implementation.

FIG. 2 illustrates an operation 200 of a management system to update cluster configurations according to an implementation. The processes of operation 200 are referenced parenthetically in the paragraphs that follow with reference to systems and elements of computing environment 100. Although demonstrated in the examples of FIGS. 1 and 2 as using a single data structure to provide operation 200, it should be understood that any number of data structures may be used to update cluster configurations in computing environment 100.

As depicted, operation 200 includes maintaining (201) at least one data structure, such as data structure 300, that indicates relationships between clusters in a computing environment. The at least one data structure may be used to associate or identify related clusters in computing environment 100 and may define dependent attributes between the clusters. For example, dependent cluster 141 may be required to access one or more virtual nodes 126-127 associated with first cluster 140. As a result, data structure 300 may indicate that dependent cluster 141 is dependent on first cluster 140 and may further indicate the attributes or information that is required to be provided to one or more virtual nodes of dependent cluster 141. The data structure may indicate attribute values, the relevant virtual nodes associated with the values, and any operations or processes required to change or implement the values in dependent cluster 141. In some implementations, an administrator or user associated with the clusters may define the required attributes for the dependent cluster. In other implementations, management system 160 may identify the required attributes based on the selection of the clusters. In particular, management system 160 may determine the types of software that are being deployed for the clusters, the versions of the software for the clusters, the size of the clusters (e.g., quantity of virtual nodes) or some other information related to the software for the clusters. Based on the information for the clusters, management system 160 may determine attributes that are required to be shared between the clusters, or attributes of a first cluster that are required by the dependent cluster.

While the at least one data structure is maintained by management system 160, management system 160 further identifies (202) a configuration modification to the first cluster. The configuration modification may include changing addressing attributes of the cluster, adding or removing virtual nodes from the cluster, updating a software configuration of the cluster, modifying credentials for the cluster, or providing some other operation with respect to the cluster. Once the configuration modification is identified, operation 200 further identifies (203) one or more clusters associated with the first cluster based on the at least one data structure. Additionally, operation 200 may determine (204) configuration modifications for the one or more clusters based on the at least one data structure.

For example, when a modification is identified for first cluster 140, management system 160 may identify other clusters in computing environment 100 that are associated with first cluster 140. Additionally, management system 160 may determine what configuration changes are required for the related clusters to provide the required interactions with first cluster 140. Here, because dependent clusters 141-142 are related to first cluster 140, management system 160 may use data structure 300 to determine what, if any, configuration modifications are required to provide continued operations of clusters 140-142. For example, if the configuration of first cluster 140 were modified to change the port at which other clusters could communicate with cluster 140, management system 160 may identify configuration modifications for dependent clusters 141-142, such that one or more virtual nodes of dependent clusters 141-142 may communicate using the updated port.

After the configuration modifications are determined for the related one or more clusters, operation 200 further initiates (205) deployment of the one or more configuration modifications in the one or more clusters. In some implementations, management system 160 may store processes capable of deploying or implementing the required configuration changes to the cluster. These operations may include providing the required attributes to the applications in the clusters, storing the attributes in the appropriate locations, or providing some other operation to update the attributes in the dependent cluster. Thus, if port addressing information changed for accessing first cluster 140, management system 160 may provide or replace any previous port addressing information in dependent clusters 141-142 with the new port addressing information.

Figure 3:
FIG. 3 illustrates a data structure to manage cluster reliance information according to an implementation.

FIG. 3 illustrates a data structure 300 to manage cluster reliance information according to an implementation. Data structure 300 includes columns for cluster identifier (ID) 310, reliant cluster ID 320, and configuration requirements 330. Cluster ID 310 includes IDs 311-314, reliant cluster ID 320 includes IDs 321-326, and configuration requirements 330 includes requirements 331-336. ID 314 is representative of a cluster ID for first cluster 140, ID 325 is representative of a cluster ID for dependent cluster 141, and ID 326 is representative of a cluster ID for dependent cluster 142. Although demonstrated as a single table in the example of FIG. 3, it should be understood that a management system may use one or more data structures that can comprise tables, linked lists, data trees, or some other data structures.

As described herein, a management system of a computing environment may maintain at least one data structure, such as data structure 300, to identify related clusters of the computing environment and corresponding attributes that are required to be shared between the related clusters. Using an example from data structure 300, cluster 140 with ID 314 is related to clusters 141-142 with IDs 325-326, wherein clusters 141-142 with IDs 325-326 may comprise edge service clusters capable of providing visualization operations, monitoring operations, and/or managing operations for cluster 140.

When a modification is made to a first cluster with an identifier in column for cluster ID 310, the management system may determine any related clusters to the first cluster in the column for reliant cluster ID 320. If any related clusters are identified, configuration requirements for the related cluster may be identified from configuration requirements 330 and compared to the modification in the first cluster. If the configuration requirements correspond to the modification to the first cluster, then a configuration modification may be determined for the reliant cluster or clusters. For example, a cluster with ID 322 includes requirements 332 of cluster associated with ID 311. As a result, when a modification is made to cluster associated with ID 311, the management system may determine whether the modification corresponds to any requirements in requirements 332. If the modification corresponds to at least one requirement in requirements 332, the management system may determine one or more configuration modifications for the cluster associated with ID 322.

In some implementations, management system 160 may store configuration processes for the various clusters deployed in computing environment 100. These configuration processes may be used to implement communication configurations (e.g., port identifiers, IP addresses, or some other communication value), may be used to change permissions or credential information, or may be used to provide and configure a cluster in any other manner.

Figure 4A:
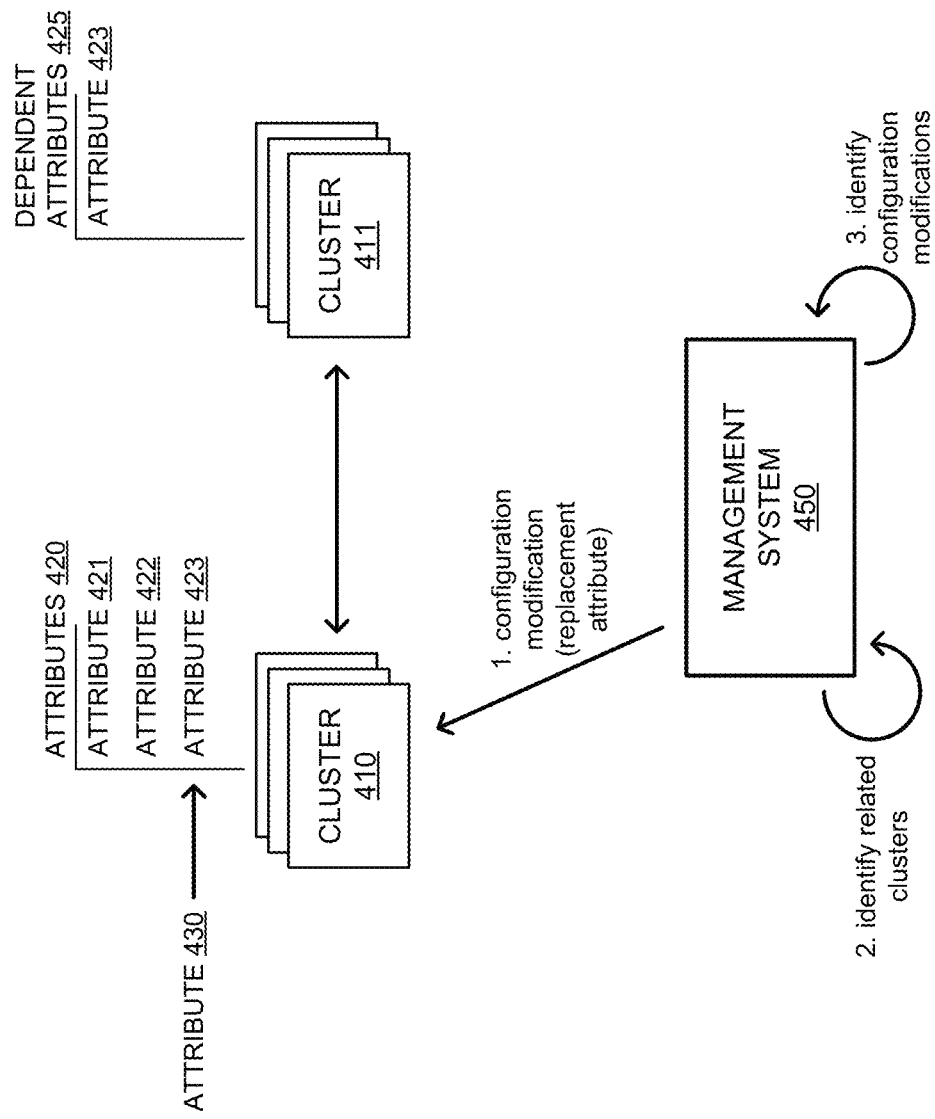
FIGS. 4A and 4B illustrate an operational scenario of updating a cluster configuration according to an implementation.
Figure 4B:
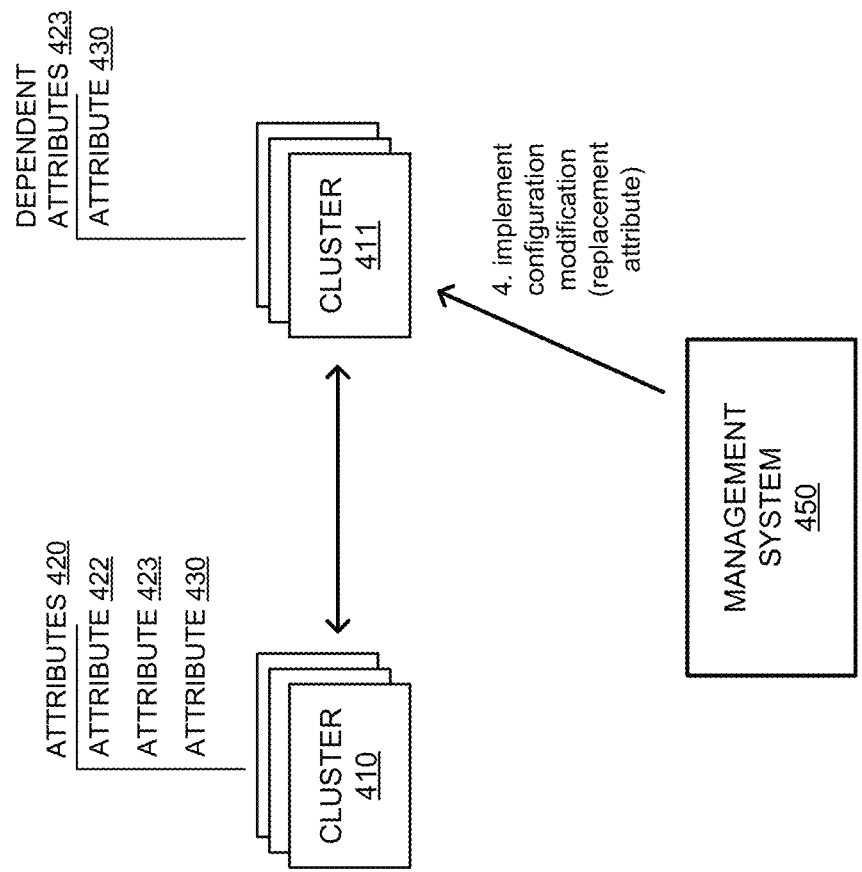

FIGS. 4A and 4B illustrate an operational scenario of updating a cluster configuration according to an implementation. FIGS. 4A and 4B include management system 450 and clusters 410-411, wherein clusters 410-411 may each include one or more virtual nodes that provide data processing or edge service operations. In the example of FIGS. 4A and 4B, cluster 411 is dependent on information associated with cluster 410. In particular, cluster 410 includes attributes 420 with individual attributes 421-423 and cluster 411 includes dependent attributes 425 with attribute 423, where attribute 423 is required from cluster 410.

Referring to FIG. 4A, management system 450 may deploy and manage clusters in a computing environment, wherein the clusters may comprise data processing clusters that process data from one or more storage repositories, or may comprise edge service clusters that can be used to visualize, manage, or monitor the data processing within the data processing cluster. Here, cluster 410 is representative of a data processing cluster and cluster 411 is representative of an edge service cluster, wherein cluster 411 may require attributes or information related to cluster 410 to interact with cluster 410. These attributes may include addressing attributes associated with cluster 410, permissions or credentials associated with cluster 410, software type or version information for cluster 410, or some other information associated with cluster 410.

During the execution of clusters 410-411, management system 450 may initiate, at step 1, a configuration modification to cluster 410. The configuration modification may include modifying addressing attributes or parameters associated with cluster 410, may include adding or removing virtual nodes associated with cluster 410, may include updating or changing the software associated with cluster 410, or may comprise any other configuration operation associated with cluster 410. In response to the cluster modification, management system 450 may identify, at step 2, clusters that are related to, or dependent on, cluster 410. Once identified, management system 450 may determine, at step 3, configuration modifications for the related clusters. In some examples, in determining the related clusters and corresponding modifications to the related clusters, management system 450 may maintain and reference one or more data structures, wherein the data structures may define related clusters and attribute requirements shared between the clusters. As a result, when a modification is identified for cluster 410, management system 450 may reference the data structures to determine that cluster 411 is related to cluster 410. Additionally, management system 450 may determine whether the modification to cluster 410 requires any configuration modifications to cluster 411. For example, if a modification were identified to attribute 422, attribute 422 is not required by cluster 411 and does not require a configuration modification. However, in the example of FIG. 4A, the configuration modification comprises replacing attribute 423 with attribute 430, wherein attribute 423 is required by cluster 411 to operate with cluster 410. Thus, a configuration modification is required in corresponding cluster 411 to maintain operations or communication between cluster 410-411.

Turning to FIG. 4B, once a configuration modification is identified as required, management system 450 implement, at step 4, the configuration modification to replace the corresponding attribute. Thus, if attribute 430 represented a replacement port number to receive communications on one or more virtual nodes of cluster 410, management system 450 may initiate operations to update processes in cluster 411 to communicate with cluster 410 using the replacement port value. In some implementations, management system 450 may maintain information about the processes and operations required to add, change, or remove attributes within a dependent cluster. The information may include storage locations for the corresponding attributes, process identifiers that require information about the attribute, or some other information to implement the required configuration change. Advantageously, rather than requiring an administrator or a user associated with cluster 411 or other dependent clusters to configure multiple clusters, a single modification to a first cluster may be identified by management system 450 and corresponding modifications may be made to the dependent clusters.

Figure 5:
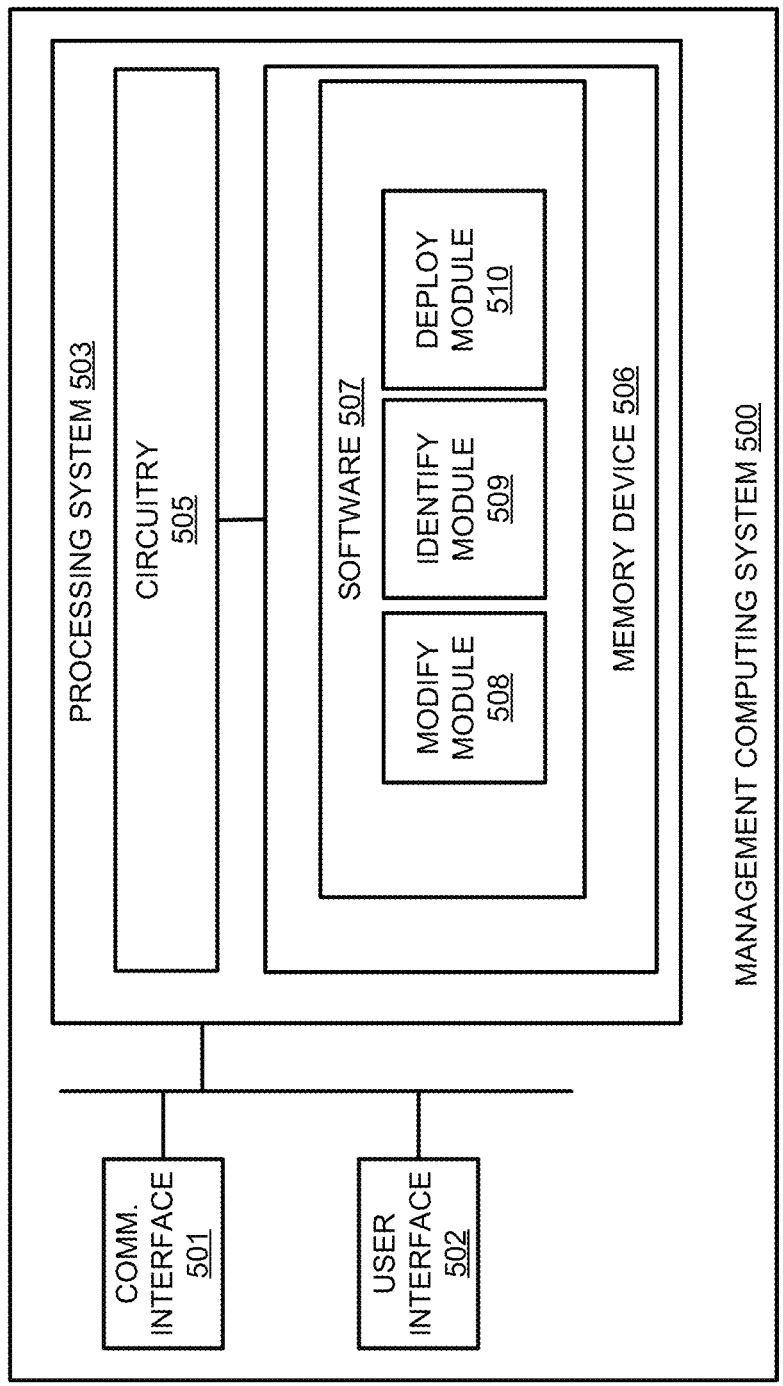
FIG. 5 illustrates a management computing system according to an implementation.

FIG. 5 illustrates a management computing system 500 according to an implementation. Computing system 500 is representative of any computing system or systems with which the various operational architectures, processes, scenarios, and sequences disclosed herein for a management system may be implemented. Computing system 500 is an example management system that could be used in initiating and configuring clusters on host systems as described herein. Computing system 500 comprises communication interface 501, user interface 502, and processing system 503. Processing system 503 is linked to communication interface 501 and user interface 502. Processing system 503 includes processing circuitry 505 and memory device 506 that stores operating software 507. Computing system 500 may include other well-known components such as a battery and enclosure that are not shown for clarity.

Communication interface 501 comprises components that communicate over communication links, such as network cards, ports, radio frequency (RF), processing circuitry and software, or some other communication devices. Communication interface 501 may be configured to communicate over metallic, wireless, or optical links. Communication interface 501 may be configured to use Time Division Multiplex (TDM), Internet Protocol (IP), Ethernet, optical networking, wireless protocols, communication signaling, or some other communication format—including combinations thereof. In at least one implementation, communication interface 501 may be used to communicate with one or more hosts of a computing environment, wherein the hosts execute clusters of one or more virtual nodes.

User interface 502 comprises components that interact with a user to receive user inputs and to present media and/or information. User interface 502 may include a speaker, microphone, buttons, lights, display screen, touch screen, touch pad, scroll wheel, communication port, or some other user input/output apparatus—including combinations thereof. User interface 502 may be omitted in some examples.

Processing circuitry 505 comprises microprocessor and other circuitry that retrieves and executes operating software 507 from memory device 506. Memory device 506 may include volatile and nonvolatile, removable and non-removable media implemented in any method or technology for storage of information, such as computer readable instructions, data structures, program modules, or other data. Memory device 506 may be implemented as a single storage device, but may also be implemented across multiple storage devices or sub-systems. Memory device 506 may comprise additional elements, such as a controller to read operating software 507. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 505 is typically mounted on a circuit board that may also hold memory device 506 and portions of communication interface 501 and user interface 502. Operating software 507 comprises computer programs, firmware, or some other form of machine-readable program instructions. Operating software 507 includes modify module 508, identify module 509, and deploy module 510, although any number of software modules may provide a similar operation. Operating software 507 may further include an operating system, utilities, drivers, network interfaces, applications, or some other type of software. When executed by processing circuitry 505, operating software 507 directs processing system 503 to operate computing system 500 as described herein.

In one implementation, modify module 508 directs processing system 503 to identify a modification to a cluster deployed in a computing environment associated with management computing system 500. In particular, one or more tenants may deploy clusters in the computing environment to provide data processing operations on data stored in one or more storage repositories. In some implementations, a subset of the clusters may perform the data processing operations using software, such as Hadoop, Spark, or some other data processing software that processes the processes the data in parallel using multiple virtual nodes. In addition to the data processing clusters, the computing environment may further execute edge service cluster that can provide visualization, management, or monitoring operations on the data processing clusters. In providing the edge services, the edge service clusters may require attributes associated with a corresponding data processing framework cluster to properly interact with the cluster. The attributes may comprise addressing attributes (IP addresses, port numbers, etc.), credentials to access the virtual nodes of the data processing framework cluster, or some other attributes that permit the edge service cluster to communicate with the data processing framework cluster. In some implementations, when the data processing cluster and the edge service cluster are deployed the clusters may be provided with first versions of the required attributes and computing system 500 may maintain at least one data structure that indicates a relationship between the clusters and the attributes that are required for the interactions between the clusters.

After a modification is identified for the first cluster, identify module 509 directs processing system 503 to identify one or more related clusters in the computing environment and determine what, if any, configuration modifications are required for the related clusters. As described previously, identify module 509 may reference at least one data structure to determine whether another cluster is related to the first cluster. If another cluster in the computing environment is related to the first cluster, identify module 509 may determine whether the other clusters require a configuration modification based on the modification to the first cluster. For example, a modification to the first cluster may comprise changing the available ports on one or more virtual nodes belonging to the first cluster that permit external clusters and systems to communicate with the one or more virtual nodes. As a result, if an edge service were configured to communicate with the one or more nodes using the initial port value, management system 500 may be required to change the port value in the edge service nodes to continue the required operations of the edge service.

After the configuration modifications are identified for the one or more dependent clusters, deploy module 510 directs processing system 503 to deploy the configuration modifications in the dependent clusters. In some implementations, computing system 500 may maintain processes or operations that are required to implement the configuration modifications in the one or more dependent clusters. In particular, when a modification is identified, deploy module 510 may determine processes or operations to store the data associated with the modification, remove the data associated with the modification, or replace data associated with the modification. Returning to the example of replacing the port value for communicating with a first cluster, deploy module 510 may determine the virtual nodes in the reliant clusters that require replacement port values to communicate with the first cluster. Once identified, deploy module 510 may determine the operations or processes required to replace the values. These operations may include identifying storage locations for the port values, identifying credential and processes to access the storage locations, or some other operation to add, remove, or replace attributes in the dependent cluster.

Returning to the elements of FIG. 1, host systems 110-112 may each comprise communication interfaces, network interfaces, processing systems, microprocessors, storage systems, storage media, or some other processing devices or software systems. Examples of host systems 110-112 can include software such as an operating system, logs, databases, utilities, drivers, networking software, and other software stored on a computer-readable medium. Host systems 110-112 may comprise, in some examples, one or more server computing systems, desktop computing systems, laptop computing systems, or any other computing system, including combinations thereof. In some implementations, host systems 110-112 may comprise virtual machines that comprise abstracted physical computing elements and an operating system capable of providing a platform for the virtual nodes of the clusters.

Management system 160 may comprise one or more communication interfaces, network interfaces, processing systems, microprocessors, storage systems, storage media, or some other processing devices or software systems, and can be distributed among multiple devices. Examples of management system 160 can include software such as an operating system, logs, databases, utilities, drivers, networking software, and other software stored on a computer-readable medium. Management system 160 may comprise one or more serving computers, desktop computers, laptop computers, or some other type of computing systems.

Communication between host systems 110-112 and management system 160 may use metal, glass, optical, air, space, or some other material as the transport media. Communication between host systems 110-112 and management system 160 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between host systems 110-112 and management system 160 may be a direct link or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   maintaining at least one data structure that indicates relationships between clusters in a computing environment;
   identifying a configuration modification to a first cluster of the clusters;
   identifying one or more clusters of the clusters associated with the first cluster based on the at least one data structure;
   determining one or more configuration modifications for the one or more clusters based on the at least one data structure;
   determining when the configuration modification to the first cluster is associated with an attribute required by the one or more clusters, wherein determining the one or more configuration modifications for the one or more clusters based on the at least one data structure occurs when the configuration modification to the first cluster is associated with an attribute required by the one or more clusters; and
   initiating deployment of the one or more configuration modifications in the one or more clusters.

2. The method of claim 1, wherein the one or more configuration modifications comprise one or more addressing modifications to provide communications between the one or more clusters and the first cluster.

3. The method of claim 2, wherein the one or more addressing modifications comprise one or more internet protocol addressing modifications or one or more port modifications.

4. The method of claim 1, wherein the clusters each comprise one or more virtual machines or containers.

5. The method of claim 1, wherein the first cluster comprises one or more virtual nodes that execute a data processing framework.

6. The method of claim 5, wherein the one or more clusters comprise one or more virtual nodes that execute a visualization or monitoring service of the data processing framework.

7. The method of claim 1, wherein the data structure defines configuration attributes of the first cluster required by the one or more clusters.

8. An apparatus comprising:
   a processing system; and
   a non-transitory computer readable storage medium storing program instructions that, when executed by the processing system, direct the processing system to:
   maintain at least one data structure that indicates relationships between clusters in a computing environment;
   identify a configuration modification to a first cluster of the clusters;
   identify one or more clusters of the clusters associated with the first cluster based on the at least one data structure;
   determine one or more configuration modifications for the one or more clusters based on the at least one data structure;
   determine when the configuration modification to the first cluster is associated with an attribute required by the one or more clusters, wherein determining the one or more configuration modifications for the one or more clusters based on the at least one data structure occurs when the configuration modification to the first cluster is associated with an attribute required by the one or more clusters; and
   initiate deployment of the one or more configuration modifications in the one or more clusters.

9. The apparatus of claim 8, wherein the one or more configuration modifications comprise one or more addressing modifications to provide communications between the one or more clusters and the first cluster.

10. The apparatus of claim 9, wherein the one or more addressing modifications comprise one or more internet protocol addressing modifications or one or more port modifications.

11. The apparatus of claim 8, wherein the clusters each comprise one or more virtual machines or containers.

12. The apparatus of claim 8, wherein the first cluster comprises one or more virtual nodes that execute a data processing framework.

13. The apparatus of claim 12, wherein the one or more clusters comprise one or more virtual nodes that execute a visualization or monitoring service of the data processing framework.

14. The apparatus of claim 8, wherein the data structure defines configuration attributes of the first cluster required by the one or more clusters.

15. A non-transitory computer readable medium storing instructions that, when executed by a processing system, cause the processing system to:
 maintain at least one data structure that indicates relationships between clusters that execute across a plurality of host systems;
 identify a configuration modification to a first cluster of the clusters;
 identify one or more clusters of the clusters associated with the first cluster based on the at least one data structure;
 determine one or more configuration modifications for the one or more clusters based on the at least one data structure;
 determine when the configuration modification to the first cluster is associated with an attribute required by the one or more clusters, wherein determining the one or more configuration modifications for the one or more clusters based on the at least one data structure occurs when the configuration modification to the first cluster is associated with an attribute required by the one or more clusters; and
 initiate deployment of the one or more configuration modifications in the one or more clusters.

16. The non-transitory computer readable medium of claim 15, wherein the one or more configuration modifications comprise one or more addressing modifications to provide communications between the one or more clusters and the first cluster.

17. The non-transitory computer readable medium of claim 15, wherein the first cluster comprises one or more virtual nodes that execute a data processing framework.

18. The non-transitory computer readable medium of claim 17, wherein the one or more clusters comprise one or more virtual nodes that execute a visualization or monitoring service of the data processing framework.

* * * * *